(12) United States Patent
White

(10) Patent No.: US 7,077,228 B1
(45) Date of Patent: Jul. 18, 2006

(54) INTEGRAL OIL TANK AND CHIN SPOILER FOR A MOTORCYCLE

(76) Inventor: Reed J. White, 1394 Green Birch Dr., Fenton, MO (US) 63026

(*) Notice: Subject to any disclaimer, the term of this patent is extended or adjusted under 35 U.S.C. 154(b) by 0 days.

(21) Appl. No.: 11/126,135

(22) Filed: May 10, 2005

Related U.S. Application Data

(60) Provisional application No. 60/586,317, filed on Jul. 8, 2004.

(51) Int. Cl.
*B01D 35/18* (2006.01)
*B62K 11/00* (2006.01)

(52) U.S. Cl. .................. 180/219; 280/830; 180/68.4
(58) Field of Classification Search ............. 180/219, 180/68.4; 280/830, 834, 835
See application file for complete search history.

(56) References Cited

U.S. PATENT DOCUMENTS

| | | | |
|---|---|---|---|
| 1,015,418 A | 1/1912 | Breed | 180/205 |
| 3,512,795 A | 5/1970 | Naeve | 280/479.1 |
| D229,612 S | 12/1973 | German | D12/218 |
| 3,837,395 A | 9/1974 | Coolidge | 165/47 |
| 3,971,452 A | 7/1976 | Morelli | 296/180.1 |
| 4,295,964 A * | 10/1981 | Preisler | 210/130 |
| 4,678,118 A | 7/1987 | Fukami et al. | 237/12.3 B |
| 4,805,717 A | 2/1989 | Trema | 180/219 |
| 4,830,134 A | 5/1989 | Hashimoto | 180/219 |
| 5,016,725 A | 5/1991 | Muramatsu | 180/225 |
| 5,244,036 A * | 9/1993 | Michl | 165/300 |
| 5,653,206 A | 8/1997 | Spurgin | 123/196 AB |
| 5,901,808 A * | 5/1999 | Swenson et al. | 180/229 |
| 5,975,230 A | 11/1999 | Bourget | 180/225 |
| 6,811,686 B1 * | 11/2004 | Sorce | 210/168 |
| 2005/0139403 A1 * | 6/2005 | Gokan et al. | 180/68.4 |

FOREIGN PATENT DOCUMENTS

| | | | |
|---|---|---|---|
| JP | 05338573 A | * | 12/1993 |
| JP | 10316071 A | * | 12/1998 |
| JP | 2000034915 A | * | 2/2000 |
| JP | 2000038177 A | * | 2/2000 |

* cited by examiner

*Primary Examiner*—Kevin Hurley
(74) *Attorney, Agent, or Firm*—Grace J. Fishel

(57) ABSTRACT

A combination oil tank and chin spoiler cantilevered from the down tubes of a motorcycle. The chin spoiler oil tank is shaped so that the volume of air flowing over the top is greater than the volume crossing the bottom. Gutters are provided inside the tank for passing recirculating oil along the sidewalls of the tank.

12 Claims, 6 Drawing Sheets

US 7,077,228 B1

INTEGRAL OIL TANK AND CHIN SPOILER FOR A MOTORCYCLE

This application claims priority from provisional application 60/586,317, filed Jul. 8, 2004, for Integral Oil Tank and Chin Spoiler for a Motorcycle.

BACKGROUND OF THE INVENTION

1. Field of the Invention

The present invention relates to a chin spoiler oil tank for attachment to a frame of an air cooled motorcycle. The spoiler directs airflow around the tank and operates to maintain the temperature of the oil circulated through the engine within an optimum temperature range.

2. Brief Description of the Prior Art

Some motorcycles have air cooled engines. In these machines, an oil pump circulates oil through the engine to lubricate the components thereof and to carry away the accumulated heat of combustion and friction. The oil from the engine is passed through a filter into an oil tank and is returned to the engine by an oil pump. Typically the oil tank is located under the rider's seat or under the transmission and may include an air cooler.

Lubricating oils have an optimum temperature range for the engine. If they are too hot they cannot effectively cool the engine and if they are too cool, they become viscous and create a drag on the engine. Air oil coolers typically depend upon air passing over the motorcycle. In the summertime, when the motorcycle is stopped and running, the temperature of the oil may rise to such a level that it is no longer capable of cooling the engine and the oil tends to break down. On the other hand, in the wintertime, the air inlets of the oil air cooler may need to be blocked to keep the oil from becoming too viscous.

What is needed is a way to condition the recirculating oil more perfectly so that it is within the temperature range that is ideal for the engine. It would further be desirable if the system could be added installed either as original equipment or as a retrofit without necessitating a redesign of the motorcycle or its frame.

Chin spoilers are sometimes mounted on motorcycle frames for wind dynamics. Air passing over the spoiler applies a downward force on the front wheel that stabilizes the steerability of the motorcycle, allowing greater speed in turns, and in cornering. Spoilers are relatively easy to install and can be retrofitted to existing motorcycles.

BRIEF SUMMARY OF THE INVENTION

In view of the above, it is an object of the present invention to provide an improved system for cooling the oil in an air cooled motorcycle. It is another object to provide a system that also improves the aerodynamics of the motorcycle in addition to cooling the oil. It is also an object to provide a system for cooling the oil that can be factory installed or retrofitted without substantial redesign of the motorcycle frame. Other objects and features of the invention will be in part apparent and in part pointed out hereinafter.

The present invention is for use with an air-cooled motorcycle having an oil pump for recirculating oil to an engine. The motorcycle has a frame with a fork stem and a pair of down tubes. The improvement comprises a hollow chin spoiler mounted on the down tubes. The hollow chin spoiler has an inlet and an outlet. Oil is circulated through the hollow chin spoiler between the inlet and outlet by the oil pump before it is recirculated to the engine.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
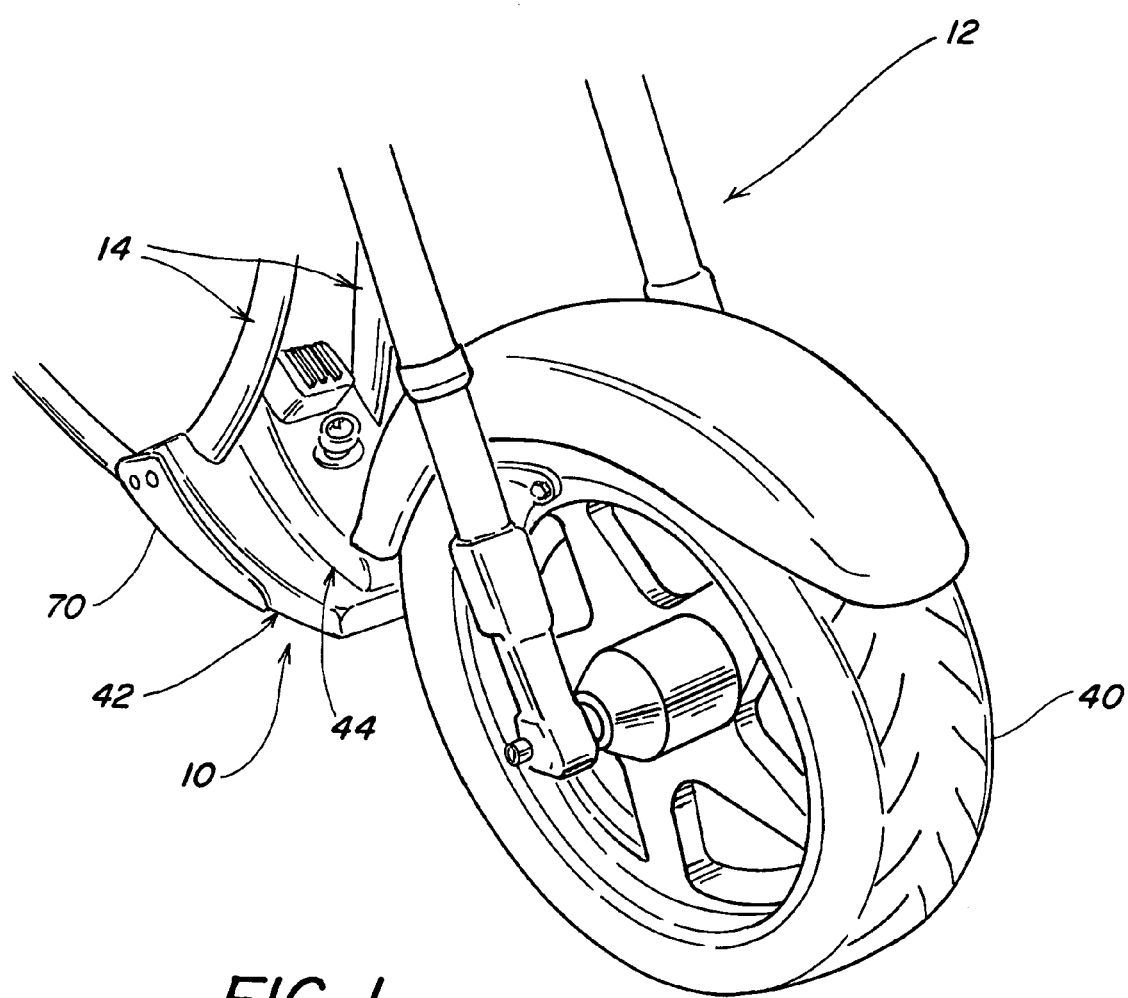
FIG. 1 is a front perspective view of a motorcycle with a chin spoiler oil tank in accordance with the present invention.

Referring to the drawings more particularly by reference number, reference numeral 10 refers to a hollow chin spoiler oil tank in accordance with the present invention. As shown in FIG. 1, chin spoiler oil tank 10 is mounted on a motorcycle 12 with an air cooled engine and a frame structure of a double cradle type. In most double cradle frames, a pair of down tubes 14 are welded at their front ends to a head pipe or fork stem. Down tubes 14 extend downwardly and curve at a front end 16 rearwardly around the engine. In other double cradle frames, down tubes 14 are not directly attached to the head pipe but branch from a pipe which is attached to the head pipe. Chin spoiler oil tank 10 may be used with both types of frames.

Figure 2:
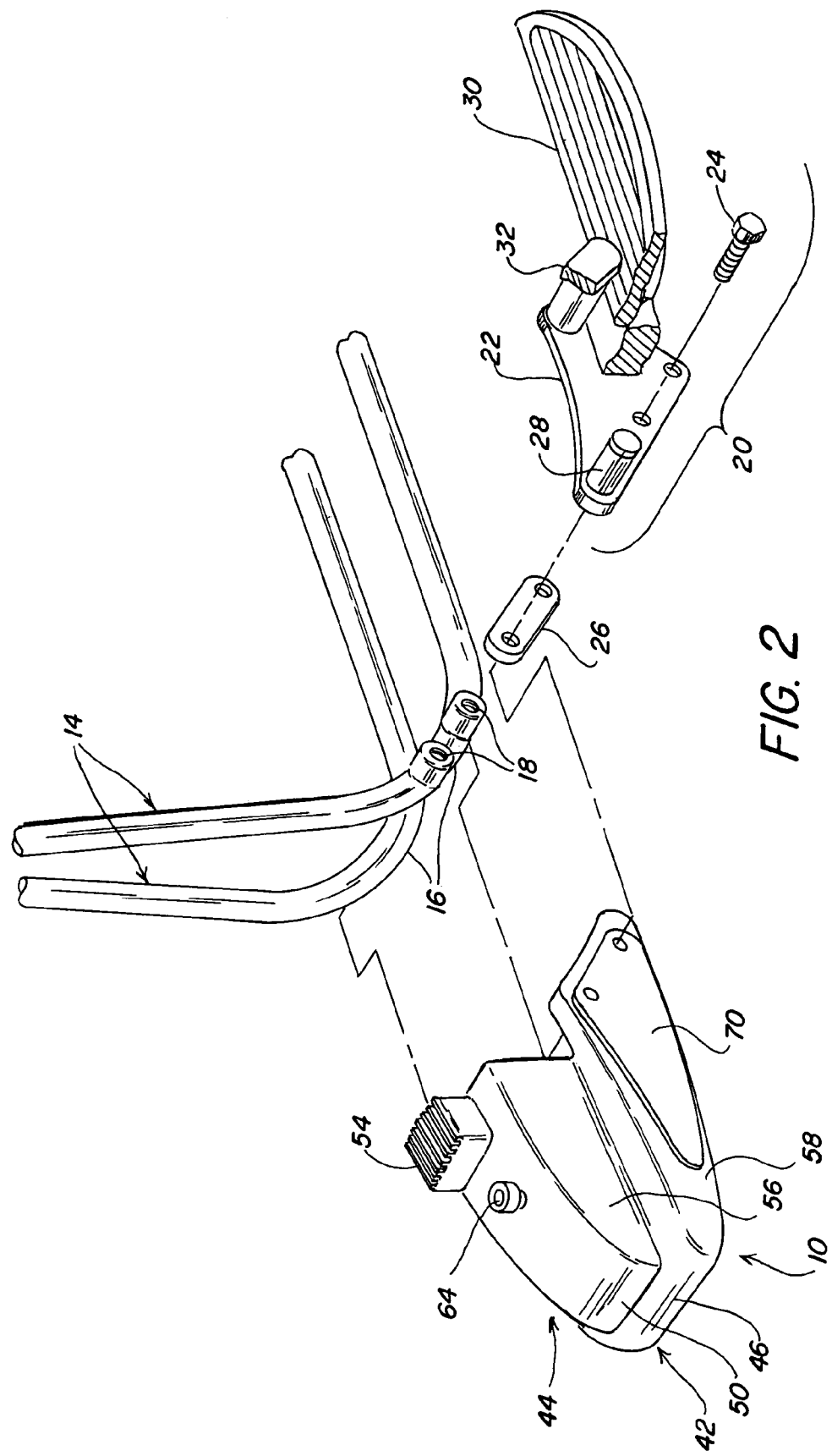
FIG. 2 is an exploded perspective view showing the attachment of the chin spoiler oil tank to the frame of the motorcycle.

In the motorcycle shown in FIG. 2, down tubes 14 have a pair of bungs 18 to which foot controls 20 of the motorcycle are attached. As illustrated, foot controls 20 include a mounting plate 22 which is bolted 24 to oppose sides of down tubes 14 through a spacer 26. On the left side of motorcycle 12, mounting plate 22 carries a foot peg 28, a floor board 30 and a shifter 32. The right side is similar except that a brake is carried by mounting plate 22. In other models, spacer 26 may be omitted, as may floor board 30, and other components attached.

Chin spoiler oil tank 10 is designed to be cantilevered from down tubes 14. This can be done by welding the tank to the down tubes or with means for mounting the tank to front end 16 of down tubes 14 such that chin spoiler oil tank 10 can be retrofitted to an existing motorcycle or installed as original equipment. Suitable mounting means are bungs 18 and bolts 24 used to attach foot controls 20. As seen in the drawings, chin spoiler oil tank 10 has a shape such that the volume of air that hits the top of the tank is larger than the volume of air that crosses the bottom. Another feature of tank 10 is that it includes an oil inlet 34 and an oil outlet 36 and may include a gutter 38 through which oil from oil inlet 34 may be flowed.

Chin spoiler oil tank 10 may be slightly wider than a front tire 40 of motorcycle 12 at a forward end and flared towards the rear. Chin spoiler oil tank 10 may be generally wedge shaped with a lower chamber 42 and a smaller upper chamber 44. Upper chamber 44 is flowably interconnected to lower chamber 42 and may be mounted on lower chamber 42. In the form illustrated in the drawings, lower chamber 42 is generally box shaped with a front wall 46 that merges into a rearwardly angled top wall 48. Upper chamber 44 is more pronouncedly wedge shaped with a more steeply rising front wall 50 that merges into a rearwardly angled top wall 52. A voltage regulator 54 may be mounted on top wall 52 of upper chamber 44 for better cooling of the regulator. Upper chamber 44 and lower chamber 42 have curved sidewalls 56, 58, respectively for better deflection of air. Front wall 46 of lower chamber 42 is wider than front tire 40 to maximize air flow around curved sidewalls 56, 58 of upper and lower chambers 44, 42, respectively.

A pair of opposing gutters 38 may be attached to the sidewalls of chin spoiler oil tank 10, for example to sidewalls 46 of upper chamber 44. Gutters 38 are formed between sidewalls 46 and a baffle 62 which is attached to the sidewalls. Gutters 38 are sloped downwardly towards the front of chin spoiler oil tank 10. Returning oil through divided oil inlet 34 is deposited into an upper portion of each gutter 38 and then runs along sidewalls 56 before it flows off gutter 38 into the pool of oil contained within chin spoiler oil tank 10.

Figure 3:
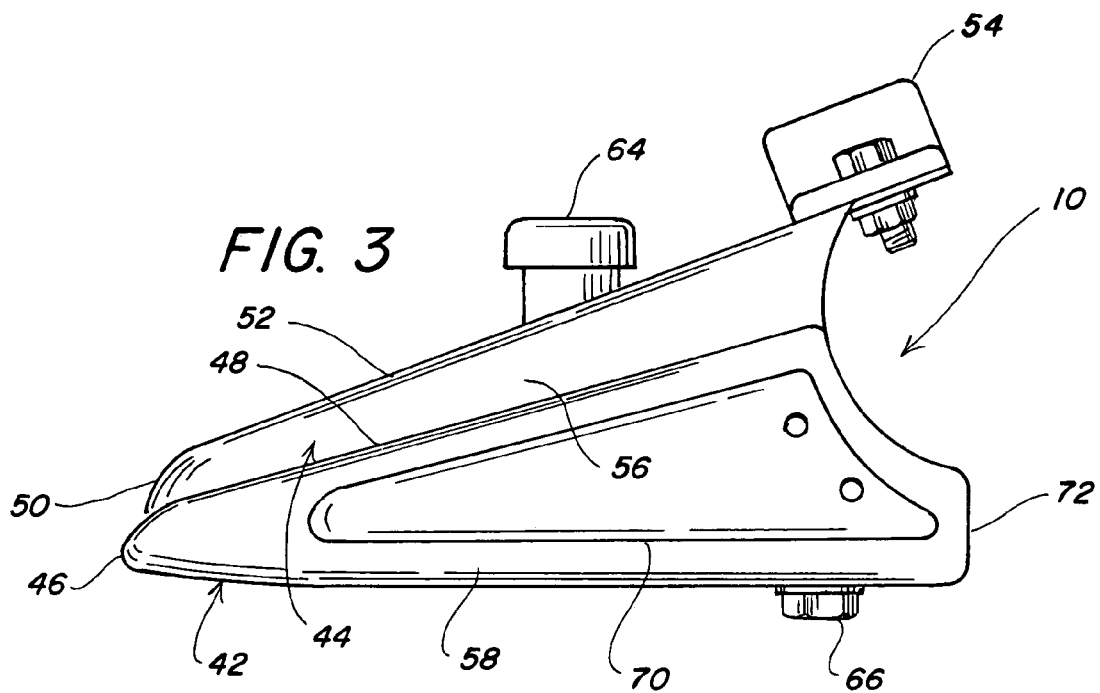
FIG. 3 is a side elevation of the chin spoiler oil tank.
Figure 4:
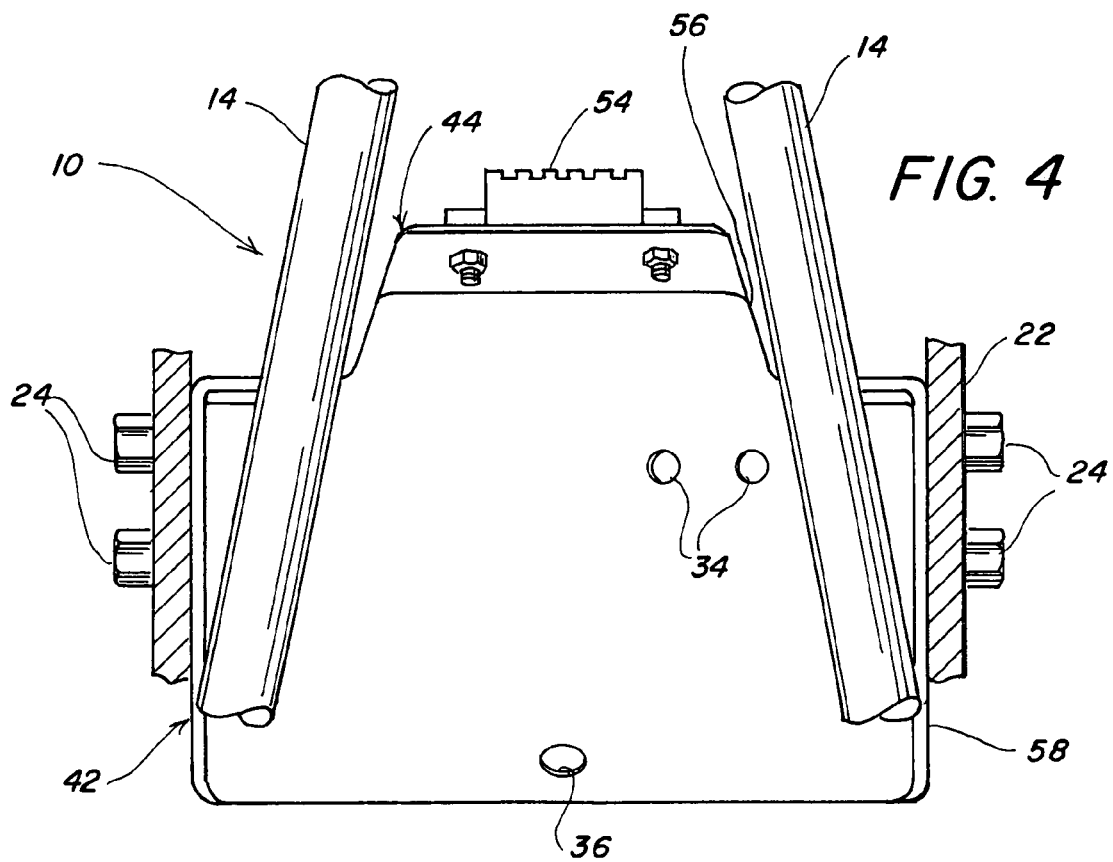
FIG. 4 is a rear elevation of the chin spoiler oil tank.

As best seen in FIG. 3, chin spoiler oil tank 10 includes a fill cap 64 and a drain cap 66. Fill cap 64 may include a dip stick (not shown) to check the oil level. Chin spoiler oil tank 10 may also include a baffle 68 at the rear of lower chamber 42 in front of oil feed outlet 36. Recirculated oil is pulled around the ends of baffle 68 along sidewalls 58 of lower chamber 42 into oil feed outlet 36.

Figure 5:
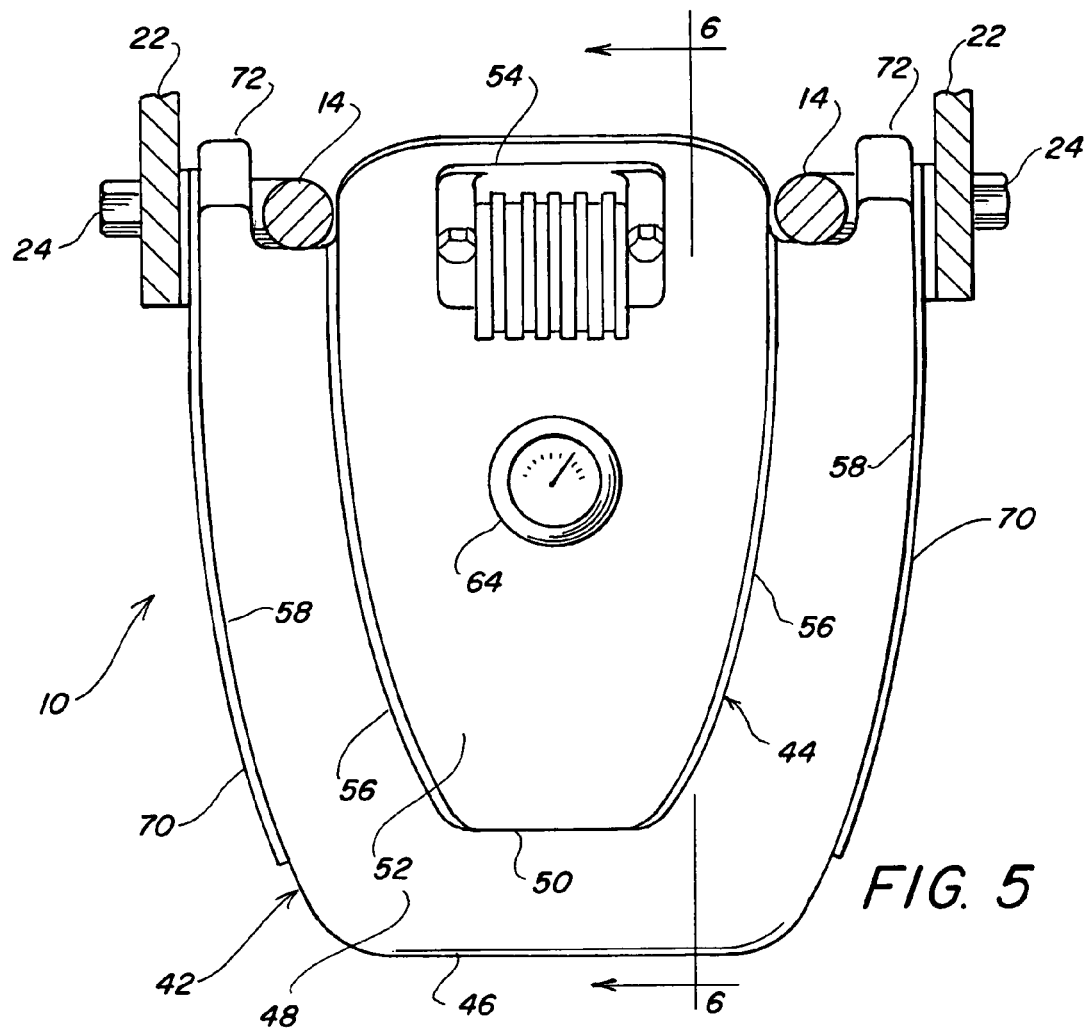
FIG. 5 is a top view of the chin spoiler oil tank.
Figure 6:
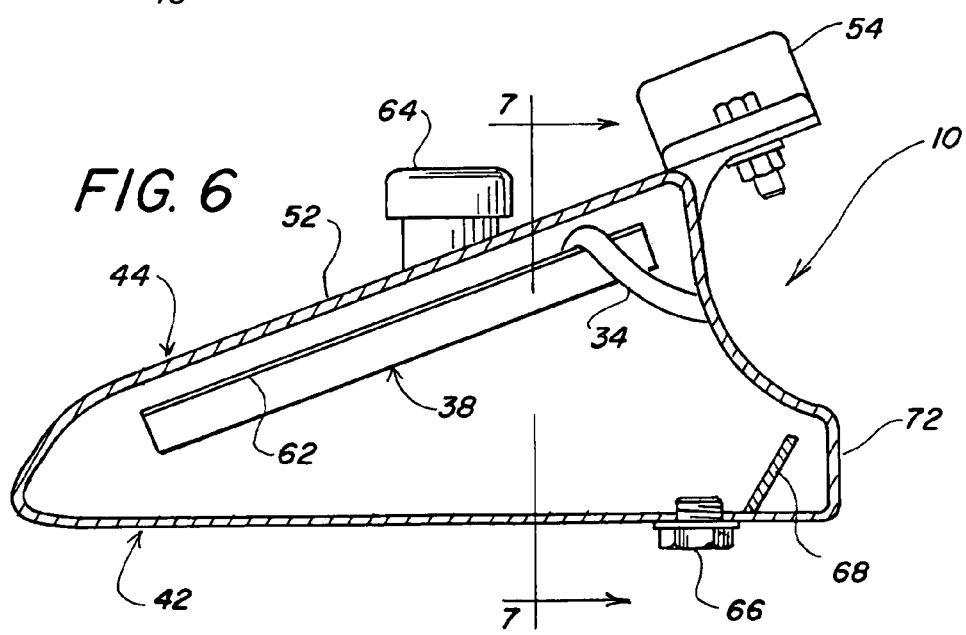
FIG. 6 is a first sectional view of the chin spoiler oil tank taken along the plane of 6—6 in FIG. 5.
Figure 7:
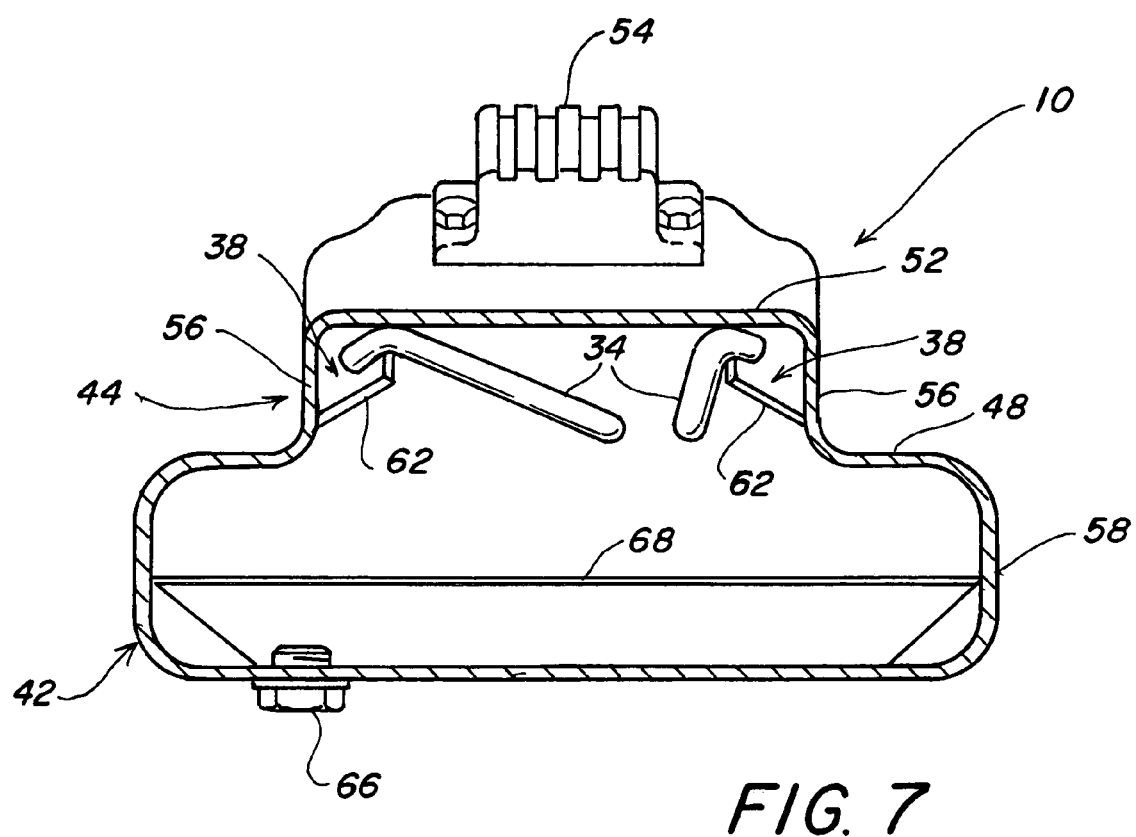
FIG. 7 is a second sectional view of the chin spoiler oil tank taken along the plane of 7—7 in FIG. 6.

Chin spoiler oil tank 10 is cantilevered to down tubes 14 with the same bolts 24 in bungs 18 used to attach foot controls 20. This attachment requires no redesign of motorcycle 12 such that chin spoiler oil tank 10 may be factory installed or retrofitted to an existing motorcycle. Cantilevered attachment of chin spoiler oil tank 10 to down tubes 14 may be facilitated with a pair of triangular gussets 70 to which chin spoiler oil tank 10 is attached and between which chin spoiler oil tank is supported. Chin spoiler oil tank 10 may include heels 72 to which gussets 70 may be attached as best seen in FIG. 5.

Figure 8:
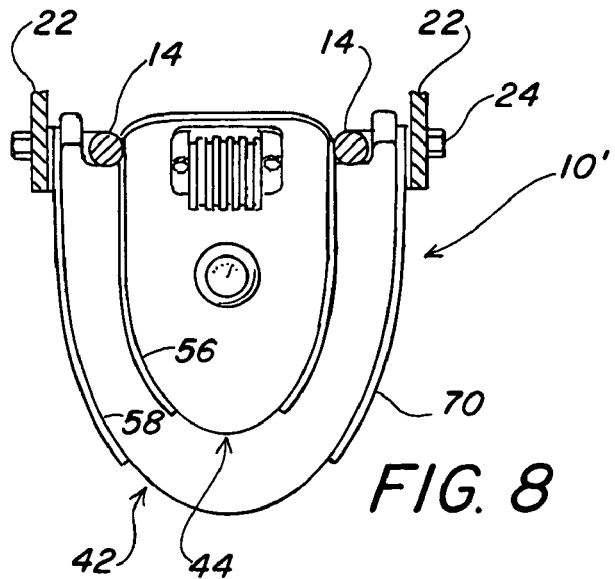
FIG. 8 is a top view of a second chin spoiler oil tank with a different shape.
Figure 9:
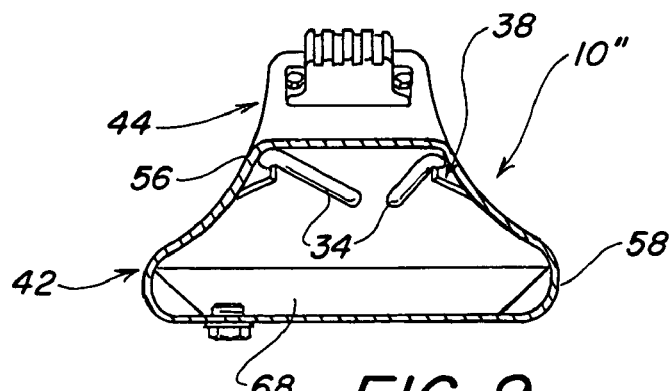
FIG. 9 is a sectional view similar to FIG. 7 of a third chin spoiler oil tank with a different shape; and, FIG. 10 is a top view of a fourth chin spoiler oil tank with a different shape.
Figure 10:
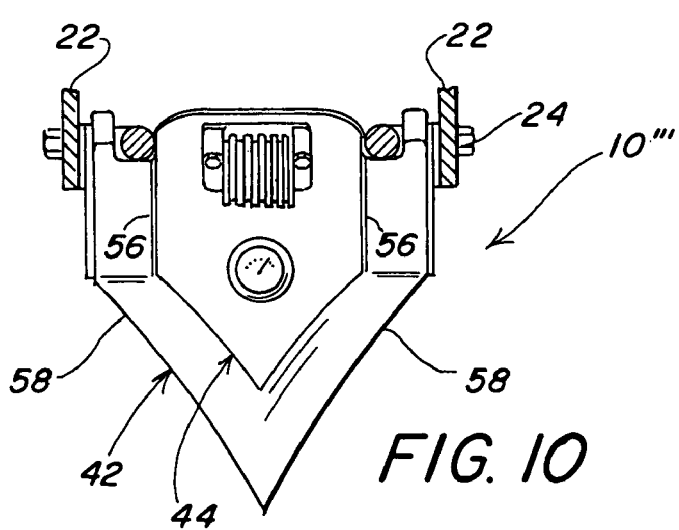

As mentioned above, lower chamber 42 may be box shaped but chin spoiler oil tank 10 may have other configurations, illustrative ones of which are shown in FIGS. 8–10. For example, upper and lower chambers 42, 44 may be rounded as shown in FIG. 8 (chin spoiler oil tank 10'), merged into a single chamber as shown in FIG. 9 (chin spoiler oil tank 10") or tapered as shown in FIG. 10 (chin spoiler oil tank 10'"). Each of the embodiments may be cantilevered from down tubes 14, have gutters 38 in upper chamber 44, baffle 62 in front of oil feed outlet 36, etc.

In use, oil is added to the system until the oil level fills lower chamber 42 and partially fills upper chamber 44. When motorcycle 12 is banked on a curve, the oil level rises in the tank on the inside of the curve and falls on the outside. Upper chamber 44 serves as a reservoir for lower chamber 42 such that the oil level stays above oil feed outlet 36 and there is no possibility that air will be inducted into the engine.

When the motorcycle 12 is in motion, airflow is directed around air spoiler oil tank 10 with the volume of air crossing under the tank being smaller than the volume of air hitting fronts 46, 50 and top walls 48, 52 of chambers 42, 44, respectively. The air hitting the top of chin spoiler oil tank 10 applies a downward force proximate front wheel 40 and improves the aerodynamic characteristics of the motorcycle particularly at higher speeds. The air passing around sidewalls 56, 58 and top of chin spoiler oil tank 48, 52 also cools the oil in the tank, particularly the oil flowing along sidewalls 56 of upper chamber 44. Baffle 68 also promotes mixing of the oil before it flows through oil outlet 36.

Even at lower speeds or when standing still, chin spoiler oil tank 10 effectively cools the recirculating oil such that it is possible to keep the temperature of the oil more closely in an ideal temperature range. Overcooling of the oil, like overheating of the oil, is a problem that is addressed by the present invention. When less cooling is required, for example in the winter, the oil level in chin spoiler oil tank 10 may be raised in upper chamber 44 such that recirculated oil entering at the upper end of gutters 38 flows only a short distance along the gutters before it is directed into the pool of oil. By decreasing the amount of cooling along sidewalls 56, it is possible to keep the temperature of the oil more closely in an ideal temperature range when it is cold outside too.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A chin spoiler oil tank for a motorcycle having a double cradle frame with a forward end and mounting means to attach foot controls for the motorcycle to the forward end of the double cradle frame, said chin spoiler oil tank having a shape such that the volume of air that hits a top of the tank is larger than the volume of air that crosses a bottom of the tank, said chin spoiler oil tank having cantilevered mounting means whereby the tank is attached to the double cradle frame with the mounting means used to attach the foot controls.

2. The chin spoiler oil tank of claim 1 comprising a wedge shaped lower chamber and a smaller wedge shaped upper chamber, said upper chamber mounted on and flowably connected to the lower chamber.

3. The chin spoiler oil tank of claim 2 further comprising an oil inlet and an oil outlet and with a gutter attached to a sidewall of the smaller upper chamber into which recirculated oil from the oil inlet is directed.

4. A chin spoiler oil tank for a motorcycle having a double cradle frame with a pair of spaced apart down tubes that extend downwardly and curve at a front end and mounting means to attach foot controls for the motorcycle to the front end of down tubes, said chin spoiler oil tank having a wedge shaped lower chamber and a smaller wedge shaped upper chamber mounted on and flowably connected to the lower chamber, said upper and lower chambers flared outwardly from front to rear and having curved sidewalls, a gutter along each sidewall of the upper chamber, said gutter sloped toward a front of the chin spoiler oil tank, said gutter formed between the sidewalls and a baffle that is attached to the sidewalls, an oil inlet for directing recirculating oil into a portion of the gutter such that the oil runs down the gutter along the sidewalls of the upper chamber, an oil outlet in the lower chamber for removing oil from the chin spoiler oil tank, said chin spoiler oil tank cantilevered from and attached to the down tubes with the mounting means used to attach the foot controls.

5. The chin spoiler oil tank of claim 4 wherein the oil outlet is formed in a rear wall of the lower chamber and a baffle extends across the lower chamber in front of the oil outlet for directing the flow of oil around the ends of the baffle.

6. The chin spoiler oil tank of claim 5 wherein a front wall of lower chamber is wider than a front tire of the motorcycle to maximize air flow around the curved sidewalls of the upper and lower chambers.

7. The chin spoiler oil tank of claim 5 wherein a pair of gussets are attached to the sidewalls of the lower chamber for supporting the chin spoiler oil tank from the down tubes.

8. The chin spoiler oil tank of claim 6 wherein the lower chamber has a pair of spaced apart heels by which the chin spoiler oil tank is attached to the down tubes by the mounting means for the foot controls.

9. A chin spoiler oil tank for a motorcycle having a double cradle frame with a pair of spaced apart down tubes that extend downwardly and curve at a front end, said chin spoiler oil tank having a shape such that the volume of air that hits a top of the tank is larger than the volume of air that crosses a bottom of the tank, said chin spoiler oil tank fixedly attached to the front end of the down tubes, said chin spoiler oil tank having a lower chamber and an upper chamber mounted above and flowably connected to the lower chamber, said upper and lower chambers are flared outwardly front to back, an oil inlet and an oil outlet, a gutter attached to opposite sidewalls of the upper chamber into which oil is directed from the oil inlet.

10. The chin spoiler oil tank of claim 9 wherein the gutters are sloped downwardly towards the front of the chin spoiler oil tank.

11. The chin spoiler oil tank of claim 10 wherein the oil outlet is formed in a rear wall of the lower chamber and a baffle extends across the lower chamber in front of the oil outlet for directing the flow of oil around the ends of the baffle.

12. The chin spoiler oil tank of claim 11 wherein the upper and lower chambers are wedge shaped and wherein the gutters are formed between the sidewalls of the upper chamber and a baffle attached to each of the sidewalls.

* * * * *